(12) United States Patent
Barad et al.

(10) Patent No.: US 10,447,397 B2
(45) Date of Patent: Oct. 15, 2019

(54) FIBRE-OPTIC COMMUNICATION SYSTEM AND AN AIRCRAFT

(71) Applicant: AIRBUS OPERATIONS LIMITED, Bristol (GB)

(72) Inventors: Kayvon Barad, Bristol (GB); Alessio Cipullo, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 15/819,319

(22) Filed: Nov. 21, 2017

(65) Prior Publication Data

US 2018/0145751 A1    May 24, 2018

(30) Foreign Application Priority Data

Nov. 23, 2016  (GB) .................................. 1619780.8

(51) Int. Cl.
*H04B 10/40*     (2013.01)
*H04B 10/25*     (2013.01)
(Continued)

(52) U.S. Cl.
CPC ......... *H04B 10/2504* (2013.01); *B64D 47/00* (2013.01); *G02B 6/3512* (2013.01); *G02B 6/4246* (2013.01); *H04B 10/2503* (2013.01); *H04B 10/2587* (2013.01); *H04B 10/40* (2013.01); *H04B 10/54* (2013.01);
(Continued)

(58) Field of Classification Search
CPC combination set(s) only.
See application file for complete search history.

(56) References Cited

U.S. PATENT DOCUMENTS 4,195,269 A * 3/1980 Ettenberg ........... H04B 10/2587
                                                     359/235
6,865,346 B1   3/2005 Miller et al.
(Continued)

FOREIGN PATENT DOCUMENTS

EP    1 703 360    9/2006
GB   2 347 806    9/2000
GB   2 543 806    5/2017

OTHER PUBLICATIONS

Combined Search and Examination Report for GB1619780.8 dated May 2, 2017, 8 pages.
(Continued)

*Primary Examiner* — Omar S Ismail
(74) *Attorney, Agent, or Firm* — Nixon & Vanderhye P.C.

(57) ABSTRACT

A fiber-optic communication system for an aircraft including: a light source operable to generate light; a transceiver in optical communication with the light source, the transceiver including a control input and a reflector; an optical fiber in optical communication with the transceiver; and a light detector in optical communication with the optical fiber. The transceiver is operable to generate an amplitude modulated light signal by selectively reflecting the light received from the light source into the optical fiber using the reflector according to information received at the control input. The light detector is operable to receive the amplitude modulated light signal from the optical fiber and to detect an amplitude of the amplitude modulated light signal to extract the information.

22 Claims, 9 Drawing Sheets

(51) Int. Cl.
    *B64D 47/00*     (2006.01)
    *G02B 6/35*     (2006.01)
    *H04B 10/54*     (2013.01)
    *H04B 10/80*     (2013.01)
    *H04B 10/2587*     (2013.01)
    *H04B 10/67*     (2013.01)
    *G02B 6/42*     (2006.01)
    *B64C 13/24*     (2006.01)
    *H04B 7/185*     (2006.01)

(52) U.S. Cl.
    CPC ........... H04B 10/67 (2013.01); H04B 10/801 (2013.01); *B64C 13/24* (2013.01); *H04B 7/18502* (2013.01); *Y02T 50/53* (2013.01)

(56) References Cited

U.S. PATENT DOCUMENTS

| | | | |
|---|---|---|---|
| 9,234,790 B2 | 1/2016 | Akkaya et al. | |
| 2002/0060825 A1* | 5/2002 | Weigold | H04B 10/40 398/139 |
| 2002/0080455 A1 | 6/2002 | Maraglit et al. | |
| 2004/0052450 A1* | 3/2004 | Morrison | G01F 23/0069 385/24 |
| 2004/0075880 A1 | 4/2004 | Pepper et al. | |
| 2007/0014577 A1 | 1/2007 | Austerlitz et al. | |
| 2009/0047024 A1* | 2/2009 | Wang | G02B 6/4214 398/135 |
| 2011/0110669 A1* | 5/2011 | Tatum | H04B 10/40 398/135 |
| 2011/0170862 A1* | 7/2011 | Smith | H04B 10/2587 398/26 |
| 2013/0051024 A1* | 2/2013 | Amit | H04B 10/40 362/259 |
| 2013/0162974 A1* | 6/2013 | Dakin | G01N 21/53 356/28 |
| 2013/0162976 A1* | 6/2013 | Dakin | G01S 7/4812 356/28.5 |
| 2013/0183044 A1* | 7/2013 | Stone | H04B 10/40 398/139 |
| 2016/0003868 A1* | 1/2016 | Prater | G01N 21/47 850/30 |
| 2016/0187266 A1* | 6/2016 | Annan | G01N 22/00 324/640 |

OTHER PUBLICATIONS

European Search Report cited in EP 17203398.7 dated Apr. 16, 2018, 10 pages.

* cited by examiner

FIBRE-OPTIC COMMUNICATION SYSTEM AND AN AIRCRAFT

RELATED APPLICATION

This application claims priority to United Kingdom Patent Application No. 1619780.8 filed Nov. 23, 2016, the entirety of which is incorporated by reference.

FIELD OF THE INVENTION

The present invention relates to fibre-optic communication systems and aircraft. A specific embodiment relates to a fibre-optic communication system located on-board an aircraft.

BACKGROUND OF THE INVENTION

Aircraft, such as airplanes and helicopters, include many different electronic components each having their own individual function(s). The individual function(s) of these electronic components work to facilitate operation of the aircraft, for example, to enable the aircraft to fly. In an example, an airplane includes a central computer system which receives, processes, and transmits information. Separately, the airplane includes one or more actuators and associated sensors. For instance, an example actuator may control the position of a stabilizer in the tail of the airplane, and an example associated sensor may be a position sensor which monitors the current position of the stabilizer. In operation, the stabilizer position sensor may transmit the current stabilizer position to the central computer system and, in return, the central computer system may transmit updated movement instructions to the stabilizer actuator which causes the actuator to drive the stabilizer to a new position.

As illustrated in the above example, there is a need to transmit and receive information or data between different electronic components of an aircraft, wherein those electronic components may be positioned in different parts of the aircraft. Such information transfers may be done in a variety of different ways and using a variety of different media. For example, electrical signals may transfer information within electrical wires, or optical signals may transfer information within optical fibres.

Accordingly, there is a continuing need to develop improved systems and methods for exchanging information between different electrical components of an aircraft.

SUMMARY OF THE INVENTION

A first aspect of the present embodiment provides a fibre-optic communication system for an aircraft, the system comprising: a light source operable to generate light; a transceiver in optical communication with the light source so as to receive the light therefrom, the transceiver comprising a control input and a reflector; an optical fibre in optical communication with the transceiver; and a light detector in optical communication with the optical fibre; and wherein the transceiver is operable to generate an amplitude modulated light signal by selectively reflecting the light received from the light source into the optical fibre using the reflector according to information received at the control input, and wherein the light detector is operable to receive the amplitude modulated light signal from the optical fibre and to detect an amplitude of the amplitude modulated light signal to extract the information.

In an embodiment, the reflector is arranged to reflect the light received from the light source into the optical fibre, and wherein the transceiver comprises a barrier operable to selectively block light transmitted into the optical fibre according to the information received at the control input to generate the amplitude modulated light signal.

In an embodiment, the barrier is positioned in a light path of the transceiver, and wherein the barrier is operable to vary its physical properties to selectively transmit or block light travelling along the light path according to the information received at the control input to generate the amplitude modulated light signal.

In an embodiment, the barrier comprises at least one of the following: an electro-optic modulator, a multiple quantum well modulator, a Mach-Zehnder modulator.

In an embodiment, the barrier is a moveable barrier positioned adjacent a light path of the transceiver, the moveable barrier being moveable between a transmission position and a blocking position according to the information received at the control input to generate the amplitude modulated light signal, wherein in the transmission position the moveable barrier is spaced from the light path, and in the blocking position the moveable barrier blocks the light path.

In an embodiment, the moveable barrier comprises at least one of the following: a microelectromechanical system (MEMS), a shutter, a rotating barrier, a push-up barrier.

In an embodiment, the reflector is a movable reflector, the moveable reflector being positioned to reflect the light received from the light source and being moveable to selectively direct the reflected light into the optical fibre according to the information received at the control input to generate the amplitude modulated light signal.

In an embodiment, the transceiver is in optical communication with the light source via the optical fibre, and wherein the light source and the light detector are in optical communication with the optical fibre via an optical coupler, the optical coupler being operable to transmit the light from the light source to the optical fibre and to transmit the amplitude modulated light signal from the optical fibre to the light detector.

In an embodiment, the optical fibre comprises a fibre Bragg grating (FBG).

In an embodiment, the fibre-optic communication system further comprises an extra light detector, an extra optical coupler, and an extra FBG, the extra FBG being in a light path between the optical coupler and the light detector such that light is reflected by the extra FBG back to the optical coupler, wherein the light source and the extra light detector are in optical communication with the optical coupler via the extra optical coupler, the extra optical coupler being operable to transmit the light from the light source to the optical coupler and to transmit the light reflected by the extra FBG from the optical coupler to the extra light detector, wherein the extra FBG is matched with the FBG.

In an embodiment, the fibre-optic communication system further comprises an energy harvesting system electrically coupled to the transceiver, the energy harvesting system being operable to generate electrical power from an external energy source and to provide the electrical power to the transceiver so as to power the transceiver.

In an embodiment, the transceiver does not include a light source.

In an embodiment, the light source is positioned in a temperature-conditioned area of the aircraft, and the transceiver is positioned in a non-temperature-conditioned area of the aircraft.

In an embodiment, the temperature-conditioned area of the aircraft is one or more of the following: an avionics bay, a passenger compartment, a flight-deck.

In an embodiment, the non-temperature-conditioned area of the aircraft is one or more of the following: a wing, a landing gear, an engine.

In an embodiment, the transceiver further comprises a further light detector in optical communication with the light source so as to receive the light therefrom, the further light detector being operable to demodulate the received light to extract further information therefrom.

In an embodiment, the fibre-optic communication system further comprises a processing device communicatively coupled to the transceiver so as to receive the further information therefrom, wherein the processing device is operable to provide the information to the control input.

In an embodiment, the fibre-optic communication system further comprises an additional transceiver and an additional optical fibre in optical communication with the additional transceiver, the additional transceiver being in optical communication with the light source so as to receive the light therefrom, the additional transceiver comprising an additional control input and an additional reflector, wherein the additional transceiver is operable to generate an additional amplitude modulated light signal by selectively reflecting the light received from the light source into the additional optical fibre using the additional reflector according to additional information received at the additional control input.

In an embodiment, the fibre-optic communication system further comprises an additional light detector in optical communication with the additional optical fibre, wherein the additional light detector is operable to receive the additional amplitude modulated light signal from the additional optical fibre and to detect an amplitude of the additional amplitude modulated light signal to extract the additional information.

A second aspect of the present invention provides an aircraft comprising a fibre-optic communication system having: a light source operable to generate light; a transceiver in optical communication with the light source so as to receive the light therefrom, the transceiver comprising a control input and a reflector; an optical fibre in optical communication with the transceiver; and a light detector in optical communication with the optical fibre; and wherein the transceiver is operable to generate an amplitude modulated light signal by selectively reflecting the light received from the light source into the optical fibre using the reflector according to information received at the control input, and wherein the light detector is operable to receive the amplitude modulated light signal from the optical fibre and to detect an amplitude of the amplitude modulated light signal to extract the information.

In an embodiment, the light source is positioned in a temperature-conditioned area of the aircraft, and the transceiver is positioned in a non-temperature-conditioned area of the aircraft. In an embodiment, the temperature-conditioned area of the aircraft is one or more of the following: an avionics bay, a passenger compartment, a flight-deck. In an embodiment, the non-temperature-conditioned area of the aircraft is one or more of the following: a wing, a landing gear, an engine.

The features and advantages stated above in respect of the first aspect are hereby re-stated in respect of the second aspect.

BRIEF DESCRIPTION OF THE DRAWINGS

Embodiments of the invention will now be described with reference to the accompanying drawings, wherein like reference signs relate to like components, and in which.

DETAILED DESCRIPTION OF EMBODIMENT(S)

Figure 1:
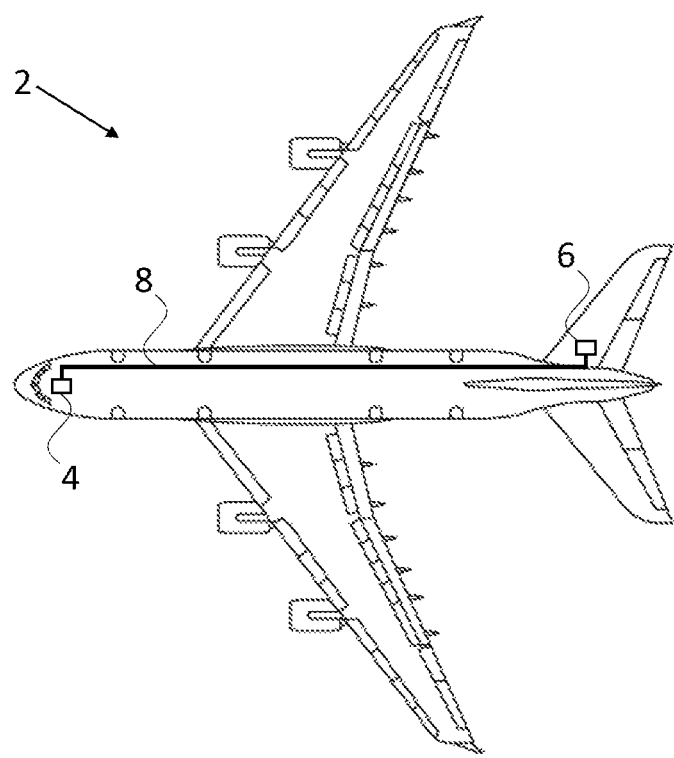
FIG. 1 is a schematic diagram of a fibre-optic communication system for an aircraft, in accordance with an embodiment of the invention.

In at least some parts of an aircraft, the operating environment can be harsh or challenging for some electronic or optical components. For instance, parts of an aircraft experience temperature fluctuations within a relatively large range, such as, for example, between about −55° C. to about 125° C. Also, parts of an aircraft experience relatively high vibrations. Such vibrations may be as defined in DO-160: Section 7 (Operational shocks and crash safety) and Section 8 (Vibrations) ("Environmental conditions and test procedures for airborne equipment", RTCA report DO-160G, DO160, 2010).

Also, for an aircraft to adhere to regulatory requirements, such as those of the European Aviation Safety Agency (EASA) or Federal Aviation Authority (FAA), significant design effort must be expended to ensure that any system (e.g. communication systems) with the aircraft has sufficient immunity to electromagnetic interference. Also, any such systems must be specifically designed to continue operating if lightning strikes the aircraft.

Optical communication systems can be attractive for aircraft use. For instance, because optical communication systems are optical (rather than electrical) in nature, such systems possess a natural level of immunity to electromagnetic interference. Also, optical communication systems tend not to conduct direct or indirect currents generated when lightning strikes the aircraft. One reason for this is that non-electrically conductive materials can be used in the manufacture of optical communication systems. Additionally, optical communication systems can be physically lighter than equivalent electrical communication systems owing to the fact that optical fibre tends to be lighter than electrical cabling. This can be particularly attractive in aircraft since there is a continuing drive to reduce weight so as to reduce aircraft fuel consumption.

However, optical communication systems can be problematic for aircraft use. Specifically, optical communication systems often include a light source, such as a laser, to act as a source of the optical signals used to transfer information within the optical communication system. As mentioned above, some areas of an aircraft are subject to a harsh operating environment, with high temperatures and vibrations. This means that in some areas of an aircraft light sources, such as lasers, require temperature regulation (e.g. cooling) in order to operate reliably and consistently. Such temperature regulating systems can be associated with various disadvantages. For example, temperature regulating systems usually require electrical power to operate and, on an aircraft, there is a continuing pressure to reduce the amount of electrical power consumed. Also, certain temperature regulating systems can malfunction or stop operating completely when subject to the harsh environment experienced in certain parts of the aircraft, which reduces the number of usable temperature regulating systems. Further, regulation requires that the light source is capable of continuing to operate even if the temperature regulating system stops working.

In summary, optical communication systems are more desirable for aircraft use compared to electrical communication systems because optical systems have: increased electromagnetic interference immunity; reduced conductivity to currents generated by lightning strikes; and, reduced weight. However, light sources struggle to operate in some areas of an aircraft which are exposed to large temperature variations and so require temperature regulation systems. Temperature regulation systems are undesirable because they consume electrical power, and struggle to operate in environments exposed to high vibrations.

Various embodiments of the invention provide a fibre-optic communication system which is suitable for use on an aircraft and aims to address the above-identified problems and considerations. Whilst embodiments are suitable for use on aircraft, at least some embodiments may not be located on-board an aircraft. For example, some embodiments may be located on a different type of moveable vehicle (e.g. a land, sea or space vehicle) or may be located on a stationary object (e.g. a building, or a land-based pylon).

In an embodiment, the fibre-optic communication system includes a light source located in a part of the aircraft that is temperature regulated, such as, for example, an avionics bay, a passenger compartment, or a flight-deck. As such, the need for the light source to have a temperature regulation system is reduced or eliminated. Additionally, the fibre-optic communication system includes a transceiver located in a part of the aircraft that is not temperature regulated, such as, for example, a landing gear, an engine, a stabilizer, a rudder, a winglet, a wing, or an elevator. The transceiver is optically connected to the light source so as to receive light therefrom. For example, the light source may be optically connected to the transceiver by an optical fibre or waveguide. The transceiver has no mechanism for generating light, for instance, the transceiver does not include a light source. Instead, the transceiver receives light from the light source. So as to facilitate the transmission of information, the transceiver generates a modulated light signal by modulating the light received from the light source according to information provided to the transceiver at a control input of the transceiver. The transceiver may include a reflector and may generate the modulated light signal using the reflector to selectively reflect the received light in accordance with an amplitude modulation scheme. The transceiver transmits the modulated light signal to a light detector in optical communication with the transceiver via an optical fibre or waveguide. The light detector may be located with the light source. In any case, the light detector is operable to demodulate the modulated light signal in order to extract the information therefrom. For instance, the light detector may extract the information from an amplitude of the modulated light signal where an amplitude modulation scheme is used.

In view of the above, the light source is housed within a temperature regulated area of the aircraft such that the need for the light source to have a temperature regulation system to operate reliably and consistently is reduced or eliminated. The transceiver can be located in an area of the aircraft which either is or is not temperature regulated. Accordingly, the transceiver can facilitate communication between a central computer of the aircraft (e.g. housed in the avionics bay) and a sensor located in a harsh environment of the aircraft, such as, on: a landing gear, an engine, a wing, or a stabilizer. Also, the transceiver does not include a light source and so can facilitate communication without requiring a temperature regulation system.

In summary, various embodiments provide an optical communication system. Optical systems are desirable for aircraft use because of: increased electromagnetic interference immunity; reduced conductivity to currents generated by lightning strikes; and, reduced weight. Also, various embodiments provide an optical communication system which does not require location of a light source in an area of the aircraft which is exposed to large temperature variations and/or high vibrations. As a result, the light source of various embodiments may not require a temperature regulation system. Also, temperature regulation systems are undesirable because they consume electrical power, and struggle to operate in high vibration environments. Accordingly, the transceiver of various embodiments is more suitable to a high vibration environment, and has significantly less power consumption compared to a laser in combination with a temperature regulation system.

In an embodiment, power consumption of the transceiver is, for example, about 0.5 mW, owing to the fact that it does not include a light source or temperature regulating system. By comparison, the power consumption of an optical transceiver having a light source and temperature regulating system is, for example, at least 1000 mW. Also, the power consumption of an electrical Ethernet transceiver is at least 400 mW, and the power consumption of an electrical wireless transceiver is at least 80 mW. An advantage of having a transceiver with reduced power consumption is that more aircraft power is left over after the installation of a communication system such that the aircraft can accommodate a wider variety of digital sensors. For instance, digital sensors which could previously not be used because of their relatively high power consumption.

Various specific embodiments of the invention will now be described with reference to FIGS. 1 to 9.

FIG. 1 shows an example aircraft 2 within which an embodiment of the invention is located. In this example, the aircraft is a fixed wing aircraft and is a passenger airplane, such as an Airbus® A380®. However, it is to be understood that in some other embodiments, a different aircraft could be used, such as, for example, a rotating wing aircraft or an unmanned aerial vehicle (UAV). For example, the aircraft could be a civil or military helicopter, or a military drone. In any case, embodiments of the invention are located on vehicles which are configured to fly during normal operation.

Returning to FIG. 1, located on the aircraft 2 is a fibre-optic communication system in accordance with an embodiment of the invention. The system includes a base unit 4 and a transceiver 6. The base unit 4 and the transceiver 6 are optically coupled together via an optical fibre 8. In this way, light and light signals can be exchanged between the base unit 4 and the transceiver 6 via the optical fibre 8.

In an embodiment, the base unit 4 is located in a first portion of the aircraft 2 whereas the transceiver 6 is located in a second portion of the aircraft 2 so as to be remote from the base unit 4. In an embodiment, the first portion of the aircraft 2 may be a portion of the aircraft 2 in which the environment is controlled or regulated. For instance, an environmental condition within the first portion may be controlled or regulated so as to be maintained at a certain value or within a certain range. Non-limiting examples of the environmental condition include: temperature, vibration, shock, humidity. Non-limiting examples of the first portion of the aircraft 2 include: an avionics bay, a flight deck, a passenger compartment, a pressurized area of the fuselage. In the embodiment of FIG. 1, the base unit 4 is located in an avionics bay which is towards a nose of the aircraft 2 and behind its flight-deck.

On the other hand, the second portion of the aircraft 2 may be a portion of the aircraft 2 in which the environment is uncontrolled or unregulated. For instance, the aforementioned environmental condition within the second portion may reach excessively high or low values, or may vary over a wide range. Non-limiting examples of the second portion of the aircraft 2 include: a wing, a winglet, an engine, a rudder, an elevator, a flap, an aileron, a spoiler, a slat, a stabilizer, a landing gear or a landing gear area. In the embodiment of FIG. 1, the transceiver 6 is located in a right-hand stabilizer of the aircraft 2.

Figure 2:
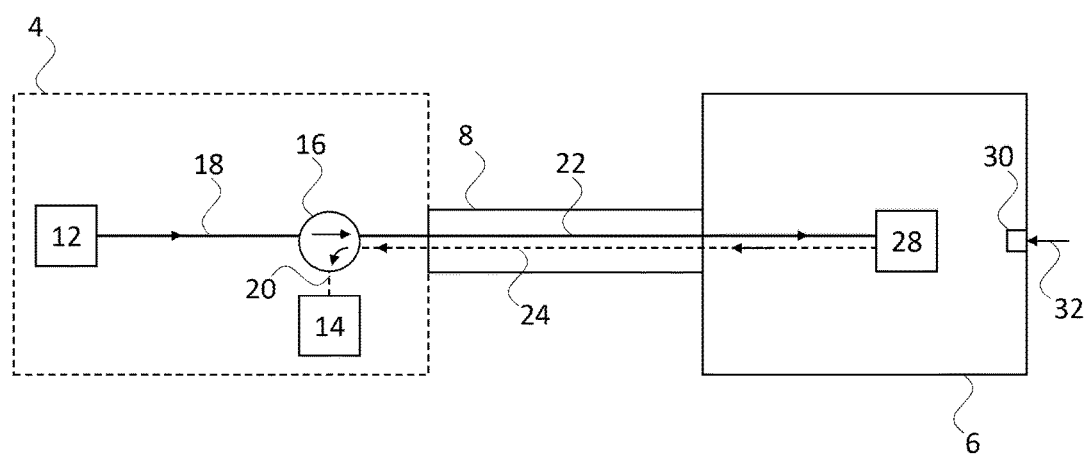
FIG. 2 is a schematic diagram of various internal components of the fibre-optic communication system of FIG. 1, in accordance with an embodiment of the invention.

FIG. 2 shows the fibre-optic communication system of FIG. 1 in more detail. In particular, the base unit 4 includes a light source 12, a light detector 14, and an optical coupler 16. The light source 12 is optically coupled to the optical coupler 16 via a light path 18. The light detector 14 is optically coupled to the optical coupler 16 via a light path 20. In an embodiment, the light paths 18 and 20 are each provided by a waveguide or an optical fibre. In an embodiment, the base unit 4 is an optical interrogator.

In this embodiment, the light source 12 is a laser but, in some other embodiments, the light source 12 is a light emitting diode (LED), such as, a superluminescent LED (SLED). Also, the light source 12 may be a narrow-band light source or a broadband light source. In any case, the light source 12 is operable to generate light. In the present disclosure, "light" should be interpreted to include the visible light portion of the electromagnetic spectrum, but also the infra-red (IR) and ultra-violet (UV) portions of the electromagnetic spectrum. In this embodiment the light source 12 generates light continuously; however, in some other embodiments, the light source 12 may generate light in regular or irregular pulses. Also, the light source 12 may use all, or only a portion, of the light spectrum. For instance, the light source 12 may generate: only visible light, or only UV light, or only a combination of visible and IR light.

In this embodiment, the light detector 14 is a photo detector but, in some other embodiments, the light detector 14 is a spectrometer. In any case, the light detector 14 is operable to detect light incident upon it. In an embodiment the light detector 14 may simply be able to detect the presence or absence of light incident upon it at a particular detection time. Alternatively, in some other embodiments, the light detector 14 may also be able to detect or determine a characteristic of incident light, such as, for example, a wavelength, a frequency, an amplitude (or magnitude), or a phase. Also, the light detector 14 may be matched to the light source 12 such that it can detect at least a portion of the electromagnetic spectrum (i.e. frequency or wavelength) generated by the light source 12.

In this embodiment, the optical coupler 16 is a circulator. However, in some other embodiments, the optical coupler 16 may be a fibre coupler (based on two or more fibres with their cores put close to each other). Alternatively, the optical coupler 16 may be a free-space optical splitter based on prisms. In the present disclosure, the term "optical coupler" is intended to be a general term which covers optical splitters, circulators and fibre couplers.

In any case, the optical coupler 16 is optically coupled to the optical paths 18 and 20 as mentioned above. Also, the optical coupler is optically coupled to two further optical paths 22 and 24. The optical path 22 is an output path of the optical coupler 16, whereas the optical path 24 is an input path of the optical coupler 16. In an embodiment, both the optical paths 22 and 24 are provided by the optical fibre 8. In use, the optical coupler 16 is operable to receive light generated by the light source 12 via the optical path 18, and to receive light from the optical fibre 8 via the optical path 24. Also, the optical coupler 16 is operable to transmit the light received from the optical path 18 into the optical path 22, and to transmit the light received from the optical path 24 into the optical path 20.

It is noted that in the Figures optical paths 22 and 24 are shown spaced from each other for clarity. In some embodiments, at least a portion of optical paths 22 and 24 overlay each other. Also, it is to be understood that light paths of the Figures may not necessarily be straight as illustrated and, instead, the light paths may include reflections off waveguide (or optical fibre) sidewalls.

The transceiver 6 includes a reflector 28 and a control input 30. The reflector 28 is optically coupled to the light source 12 via the optical paths 18 and 22 and the optical coupler 16. As a result, the reflector 28 is configured to receive the light generated by the light source 12. Also, the reflector 28 is optically coupled to the light detector 14 via the optical paths 24 and 20 and the optical coupler 16. As a result, the reflector 28 is configured to transmit reflected light to the light detector 14. For completeness, it is noted that the reflector 28 is optically coupled to the optical fibre 8. In an embodiment, the transceiver 6 and/or base unit 4 are directly physically connected to the optical fibre 8 or are indirectly physically coupled to the optical fibre 8 via an intermediate mechanical coupling (not shown).

In this embodiment, the control input 30 of the transceiver 6 is an electrical input and, as such, is operable to receive an electrical signal. In any case, the control input 30 is operable to receive an information signal or information 32. In this embodiment, the information 32 is a binary data signal but, in some other embodiments, the information 32 is another form of discrete data signal or is a continuous data signal. In any case, the transceiver 6 is operable to generate an amplitude modulated light signal in optical path 24 by selectively reflecting the light received from optical path 22 into (or out of) the optical fibre 8 using the reflector 28 according to the information 32 received at the control input 30. For example, the transceiver 6 may move the reflector 28 to direct reflected light into or out of the optical fibre 8. Alternatively, the transceiver 6 may control a path of the light from optical path 22 towards or away from the reflector 28. Alternatively, the transceiver 6 may selectively absorb light from optical path 22 before it reaches the reflector 28.

The following example scenario explains how the transceiver 6 generates a signal which is amplitude modulated. The information 32 may be a binary data signal and, as such, may contain a stream of '0' and '1' bits. When a '1' bit is received by the transceiver 6 via the control input 30, the transceiver 6 is operable to use the reflector 28 to reflect the light received from optical path 22 into the optical path 24. In this way, when a '1' bit is present, the optical fibre 8 contains reflected light having an amplitude. Alternatively, when a '0' bit is received by the transceiver 6 via the control input 30, the transceiver 6 is operable to use the reflector 28 to reflect the light received from the optical path 22 anywhere other than into the optical path 24. In this way, when a '0' bit is present, the optical fibre 8 does not contain reflected light or, stated differently, it contains reflected light with a zero amplitude. Accordingly, the amplitude of a reflected light signal output from the transceiver 6 along optical path 24 is modulated according to the information 32 at the control input 30. It is noted that the above could be reversed such that a '0' bit is represented by reflected light and a '1' bit is represented by no reflected light. For completeness, the term 'modulate' is taken to mean the encoding of information (or data) to a media (e.g. light) in such a way that the information may be extracted or retrieved from the media at another point (e.g. the light detector 14). The extraction phase will now be described with reference to the light detector 14.

As mentioned above, the optical path 24 from the transceiver 6 via the optical fibre 8 to the optical coupler 16 contains an amplitude modulated light signal. The optical coupler 16 transmits this amplitude modulated signal into the optical path 20 such that the signal is received by the light detector 14. The light detector 14 is operable to detect the amplitude of the amplitude modulated light signal to extract the information. For example, where the light detector 14 detects light in optical path 20, the light detector 14 recovers a '1' bit. Alternatively, where the light detector 14 detects no light (or light with zero amplitude) in the optical path 20, the light detector 14 recovers a '0' bit. In this way, the information 32 is recovered from the amplitude modulated light signal received by the light detector 14. In this way, either discrete signal (on/off) or serial communication can be achieved. In an example application, the fibre-optical communication may be used to perform on/off keying (OOK).

It is noted that some embodiments may operate with various light thresholds instead of, or in addition to, detecting the presence or absence of light. For example, due to mechanical tolerances or design, the transceiver 6 may use the reflector 28 to reflect more light into optical path 24 on a '1' bit compared to on a '0' bit. As such, the amplitude modulated light signal may always have an amplitude; however, a relatively large amplitude may indicate a '1' bit and a relatively small amplitude may indicate a '0' bit. For example, an amplitude above a higher threshold may indicate a '1' bit and an amplitude below a lower threshold may indicate a '0' bit. Alternatively, an amplitude above a single threshold may indicate a '1' bit and an amplitude below that single threshold may indicate a '0' bit. In any case, the transceiver 6 operates to generate an amplitude modulated light signal. In this way, embodiments may provide fault monitoring wherein no light signal indicates a break in the fibre or a malfunction in the light source 12 or transceiver 6.

Three different example implementations of the transceiver 6 will now be described with reference to FIGS. 3 to 5. In each of FIGS. 3 to 5, the base unit 4 is not shown for clarity. However, it is to be understood that the base unit 4 of FIG. 2 would be present in each of the implementations of FIGS. 3 to 5.

Figure 3:
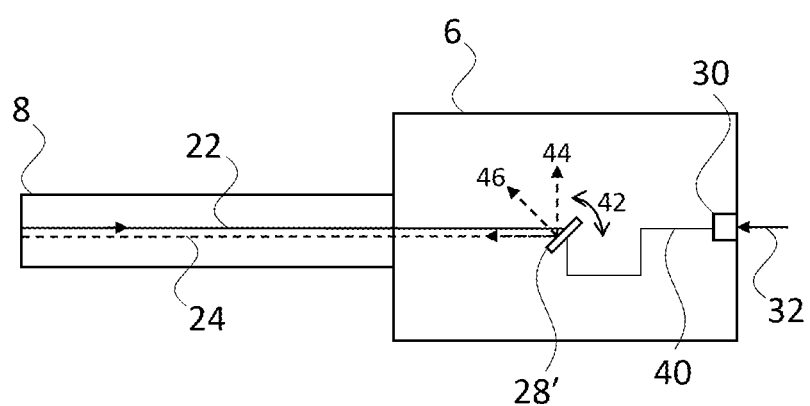
FIG. 3 is a schematic diagram of a transceiver of the fibre-optic communication system of FIG. 2, in accordance with an embodiment of the invention.

FIG. 3 shows an embodiment including an electrically actuated reflector or moveable reflector 28'. The movable reflector 28' may be a scanning mirror as used in some projectors, or a moving mirror as used in some dense wavelength division multiplexing (DWDM) applications. The movable reflector 28' is communicatively coupled to the control input 30 via link 40 so as to receive the information 32 therefrom. In use, the movable reflector 28' moves as indicated by arrow 42 to direct a reflected version of light from optical path 22 into and out of optical path 24. For example, the movable reflector 28' may have first and second preset positions. In the first position, the movable reflector 28' reflects light from optical path 22 away from the optical path 24, such as, for example, along optical paths 44 or 46. In the second position, the movable reflector 28' reflects light from the optical path 22 into the optical path 24. Accordingly, the moveable reflector 28' may be operable to enter the first position when a '0' bit is received via link 40 and may be operable to enter the second position when a '1' bit is received via link 40. In an embodiment, the moveable reflector 28' is a microelectromechanical system (MEMS).

In summary, therefore, the moveable reflector 28' is positioned to reflect light received from optical path 22. Also, the movable reflector 28' is moveable to selectively direct the reflected light into the optical path 24 of the optical fibre 8 according to the information 32 received at the control input 30 to generate the amplitude modulated light signal.

In an alternative embodiment, a processor unit (not shown) may be positioned within link 40 so as to receive the information 32 from the control input 30. The processor unit may process the information 32 to generate a control signal to control the moveable reflector 28' into the first or second position depending on the contents of the information 32. This control signal may then be send from the processor unit to the moveable reflector 28' so as to control its operation.

Figure 4:
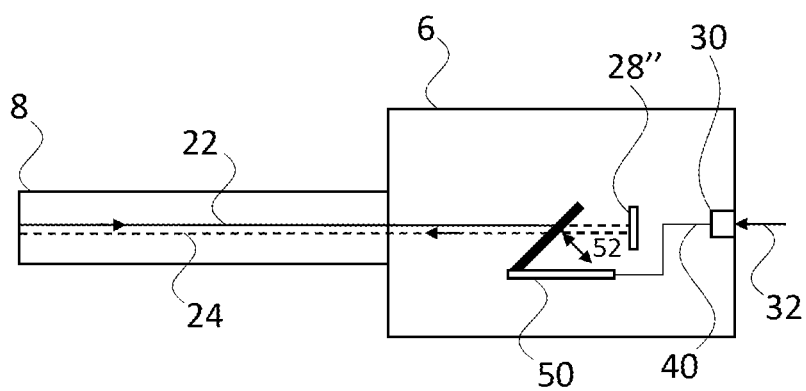
FIG. 4 is a schematic diagram of a transceiver of the fibre-optic communication system of FIG. 2, in accordance with another embodiment of the invention.

FIG. 4 shows an embodiment including a fixed reflector 28" and a movable barrier 50. The fixed reflector 28" may be a mirror, a retro-reflector, or a prism-type retro-reflector. The fixed reflector 28" is positioned to receive light from the optical path 22 and to reflect that light into the optical path 24. The movable barrier 50 is communicatively coupled to the control input 30 via the link 40 so as to receive the information 32 therefrom. In use, a movable portion of the movable barrier 50 moves as indicated by arrow 52 to permit or prevent light from optical path 22 reaching the fixed reflector 28". For example, the movable portion may have first and second preset positions. In the first position, the movable portion blocks light received from optical path 22 such that the blocked light is prevented from reaching the fixed reflector 28" and ultimately from reflecting into the optical path 24. The movable barrier 50 may be reflective so as to reflect light away from the fixed reflector 28" when in the first position. In the second position, the movable portion permits light from the optical path 22 reaching the fixed reflector 28" such that the fixed reflector 28" reflects light into the optical path 24. Accordingly, the moveable portion may be operable to enter the first position when a '0' bit is received via link 40 and may be operable to enter the second position when a '1' bit is received via link 40. In an embodiment, the moveable barrier 50 is a microelectromechanical system (MEMS). In the embodiment of FIG. 4, the movable barrier 50 is a push-up barrier; however, in some other embodiments, the movable barrier 50 may be a shutter or a rotating barrier.

In summary, the fixed reflector 28" is arranged to reflect the light receive from optical path 22 into optical path 24. Also, the transceiver 6 includes a barrier operable to selectively block light transmitted into the optical path 24 according to the information 32 received at the control input 30 to generate the amplitude modulated light signal. Specifically, the barrier is a moveable barrier 50 positioned adjacent a light path of the transceiver 6 corresponding to optical path 22. The moveable barrier 50 is moveable between a transmission position (e.g. the second position) and a blocking position (e.g. the first position) according to the information 32 received at the control input 30 to generate the amplitude modulated light signal. In the transmission position, the moveable barrier 50 is spaced from the light path, and in the blocking position the moveable barrier 50 blocks the light path.

In an analogous manner to as described above with reference to FIG. 3, the transceiver 6 of FIG. 4 may include a processor unit positioned within link 40 so as to receive the information 32 and to generate a control signal therefrom for provision to the movable barrier 50.

Figure 5:
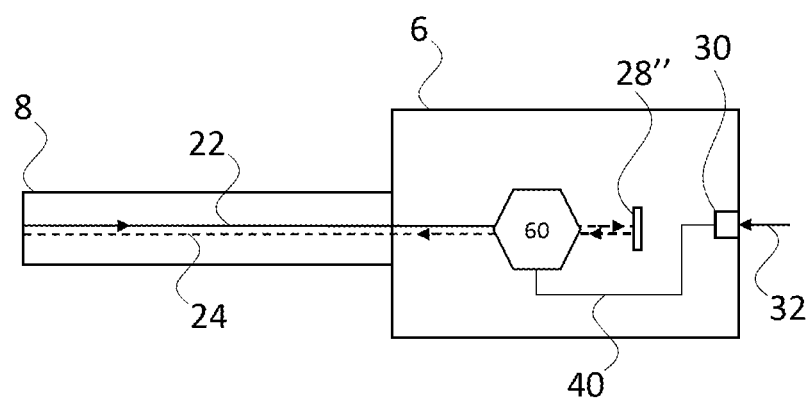
FIG. 5 is a schematic diagram of a transceiver of the fibre-optic communication system of FIG. 2, in accordance with a further embodiment of the invention.

FIG. 5 shows an embodiment including the fixed reflector 28" and a stationary barrier 60. As before, the fixed reflector 28" is positioned to receive light from the optical path 22 and reflect that light into the optical path 24. The stationary barrier 60 is communicatively coupled to the control input 30 via the link 40 so as to receive the information 32 therefrom. The stationary barrier 60 is positioned in the optical path 22. In use, the stationary barrier 60 alters its physical properties to permit or prevent light from optical path 22 reaching the fixed reflector 28". For example, the stationary barrier 60 may be operable to alter its transparency, opacity or refractive index. Taking refractive index as an example, with a first preset refractive index, the stationary barrier 60 refracts light received from optical path 22 such that the refracted light is absorbed or directed away from the fixed reflector 28" and thereby is prevented from reflecting into the optical path 24. With a second preset refractive index, the stationary barrier 60 refracts light received from optical path 22 such that the refracted light is directed at the fixed reflector 28". By analogy, the light reflected from the fixed reflector 28" via optical path 24 is refracted by the stationary barrier 60 such that the refracted light is transmitted along the optical path 24 into the optical fibre 8. In other words, the stationary barrier 60 may permit transmission in both directions with the second preset refractive index. Accordingly, the stationary barrier 60 may be operable to adopt the first preset refractive index when a '0' bit is received via link 40 and may be operable to adopt the second preset refractive index when a '1' bit is received via link 40. In an embodiment, the stationary barrier 60 is an electro-optic modulator. For example, the stationary barrier 60 is a Mach-Zehnder interferometer, perhaps using a lithium niobate crystal. In a related embodiment, the stationary barrier 60 and the fixed reflector 28" maybe provided by a modulating retro-reflector or a multiple quantum well (MQW) modulator.

In summary, the fixed reflector 28" is arranged to reflect the light received from optical path 22 into optical path 24. Also, the transceiver 6 includes a barrier operable to selectively block light transmitted into the optical path 24 according to the information 32 received at the control input 30 to generate the amplitude modulated light signal. Specifically, the barrier is a stationary barrier 60 positioned in a light path of the transceiver 6 which corresponds to the optical path 22. Also, the stationary barrier 60 is operable to vary its physical properties to selectively transmit or block light travelling along the light path according to the information 32 received at the control input 30 to generate the amplitude modulated light signal. In an embodiment, the physical properties include refractive index.

In an analogous manner to as described above with reference to FIGS. 3 and 4, the transceiver 6 of FIG. 5 may include a processor unit positioned within link 40 so as to receive the information 32 and to generate a control signal therefrom for provision to the stationary barrier 60.

In the above described embodiments of FIGS. 3 to 5, the light reflected by the transceiver 6 is modulated by a modulation device, i.e. moveable reflector 28', moveable barrier 50, or stationary barrier 60. Also the modulation devices have a lower power consumption and are less sensitive to high temperature than a light source, such as a laser.

An advantage of the embodiment of FIG. 3 is that moveable reflectors, such as scanning mirrors, have a relatively fast response time compared to moveable barriers, such as MEMS shutters, rotating barriers or push-up barriers. Similarly, an advantage of the embodiment of FIG. 5 is that stationary barriers, such as electro-optical modulators, have a relatively fast response time compared to moveable barriers, such as MEMS shutters, rotating barriers or push-up barriers. An advantage of the embodiment of FIG. 4 is that less accurate control of the movable barrier is required compared to the movable reflector, since the light path must only be blocked rather than accurately steered into position. An advantage of the embodiment of FIG. 5 is that it includes no moving parts which can improve durability, particularly in high vibration environments such as on parts of aircraft (e.g. landing gear).

Figure 6:
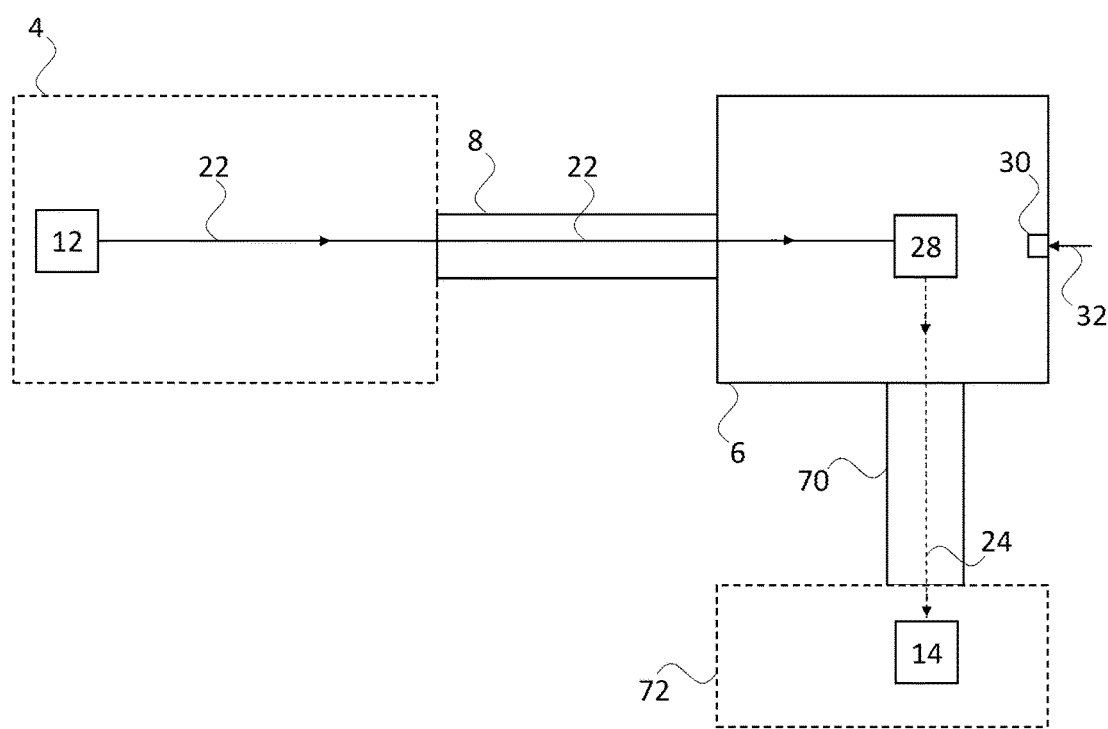
FIG. 6 is a schematic diagram of a fibre-optic communication system in accordance with another embodiment of the invention.

FIG. 6 shows a fibre-optic communication system according to an embodiment which is different from that of FIG. 2. As shown in FIG. 6, the base unit 4 includes the light source 12 but not the light detector 14. As before, the light source 12 is operable to generate light and transmit the generated light along optical path 22; however, in FIG. 6 there is no optical coupler 16 positioned in this pathway. As before, the optical path 22 extends through the optical fibre 8 to the transceiver 6. The transceiver 6 may be as shown and described above with respect to any one of FIGS. 2 to 5; however, in the embodiment of FIG. 6, the reflector 28, 28' or 28" is positioned and orientated so that incoming light from the optical path 22 is reflected into outgoing optical path 24 which is located within an optical fibre 70.

In an embodiment, the optical fibre 70 is coupled at one end to the transceiver 6 and at the other end to a second base unit 72. The coupling may be a direct physical connection or an indirect physical coupling via an intermediate mechanical coupling (not shown). The second base unit 72 contains the optical detector 14 which, as before, receives light signals from the optical path 24. Accordingly, the optical path 24 carries the amplitude modulated light signal from the transceiver 6 via the optical fibre 70 to the light detector 14. The operation of the light detector 14 is as described above with reference to FIG. 2.

In summary, the arrangement of FIG. 6 differs from the arrangement of FIGS. 2 to 5 in that the transceiver 6 receives light from the light source 12 via one optical fibre (i.e. optical path 22 in optical fibre 8) and transmits the amplitude modulated light signal via another optical fibre (i.e. optical path 24 in optical fibre 70). The embodiment of FIG. 6 shows about a 90° angle between the optical fibre 8 and the optical fibre 70; however, it is to be understood that in some different embodiments, the angle between the two optical fibres 8, 70 is greater or less than 90°. As such, the first and second base units 4, 72 can be positioned in completely different parts of the aircraft 2. Also, the second base unit 72 can be positioned in either an environment-conditioned/regulated part of the aircraft 2 (e.g. avionics bay) or an environment-unconditioned/unregulated part of the aircraft 2 (e.g. stabilizer). Another feature of the embodiment of FIG. 6 is that it does not require the optical coupler 16 of FIG. 2.

Figure 7:
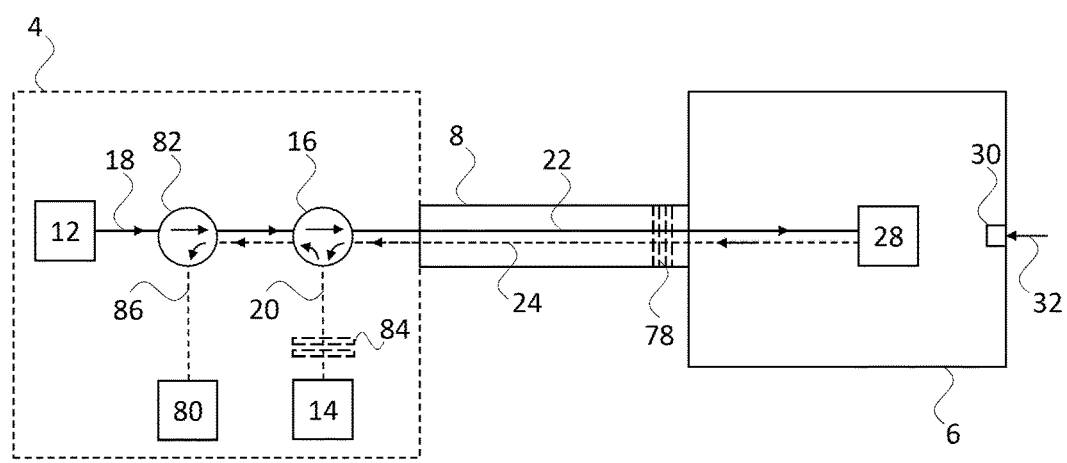
FIG. 7 is a schematic diagram of a fibre-optic communication system in accordance with an additional embodiment of the invention.

FIG. 7 shows a fibre-optic communication system according to an embodiment which is different from that of FIG. 6 and is an extension of the embodiment of FIG. 2. Specifically, as before, the system includes the base unit 4 optically coupled to the transceiver 6 via the optical fibre 8. The transceiver 6 may be as shown and described with reference to any one of FIGS. 2 to 5. The optical fibre 8 is as described above; however, the optical fibre includes at least one fibre Bragg grating (FBG) 78. In an embodiment, the FBG 78 is positioned at an end region of the optical fibre 8 which is closest to or adjacent to the transceiver 6. In use, the FBG 78 reflects light having a particular wavelength (or range of wavelengths) and transmits all other light. Accordingly, a portion of the light transmitted from the optical coupler 16 to the transceiver 6 is reflected by the FBG 78 back to the optical coupler 16 before it reaches the transceiver 6.

As before, the base unit 4 includes: the light source 12, the light detector 14, and the optical coupler 16. Additionally, however, the base unit 4 further includes: an extra light detector 80, an extra optical coupler 82, and an extra FBG 84. The extra FBG 84 is positioned in the optical path 20 between the optical coupler 16 and the light detector 14. As before, the extra FBG 84 reflects light having a particular wavelength (or range of wavelengths) and transmits all other light. In this way, the extra FBG 84 reflects a portion of the light traveling towards the light detector 14 back to the optical coupler 16 before it reaches the light detector 14.

It is additionally noted that the FBG 78 and the extra FBG 84 are matched. The term "matched" means that under normal operating conditions, both the FBG 78 and the extra FBG 84 are configured to reflect at least one common wavelength (or frequency) of the electromagnetic spectrum. For example, the FBG 78 and the extra FBG 84 may be configured to reflect the same light wavelength or range of wavelengths.

The extra optical coupler 82 is positioned in the optical path 18 between the light source 12 and the optical coupler 16. Also, the extra light detector 80 is in optical communication with the extra optical coupler 80 via a separate optical path 86. In use, the extra optical coupler 82 receives light from the light source 12 and transmits the received light to the optical coupler 16. Also, the extra optical coupler 82 receives the portion of light reflected by the extra FBG 84 and transmits that portion to the extra light detector 80 via the optical path 86. For completeness, the optical coupler 16 operates as described above with reference to FIG. 2 but also transmits the portion of light reflected by the additional FBG 84 to the extra optical coupler 82.

In summary, the light source 12 and the extra light detector 80 are in optical communication with the optical coupler 16 via the extra optical coupler 82. Also, the extra optical coupler 82 is operable to transmit light from the light source 12 to the optical coupler 16 and to transmit light reflected by the extra FBG 84 from the optical coupler 16 to the extra light detector 80.

In use, the FBG 78 and extra FBG 84, in combination with the extra light detector 80 and extra optical coupler 82, provide a means for detecting a malfunction in the optical fibre 8 which prevents or impedes the optical fibre's ability to transmit light to the transceiver 6. Specifically, to be detected, the fault in the fibre 8 must be located between the base unit 4 and the FBG 78 and, therefore, in an embodiment, the FBG 78 is positioned as close as possible to the end of the fibre 8 closest the transceiver 6. For example, the malfunction may be a full or partial break, fracture, or tear of the optical fibre 8. In particular, when the optical fibre 8 is working normally, the FBG transmits all light apart from light having a specific wavelength. The light having the specific wavelength is reflected by the FBG 78 back to the optical coupler 16 before it reaches the transceiver 6. The optical coupler 16 transmits the light having the specific wavelength along optical path 20. The extra FBG 84 is positioned in the optical path 20 and is matched with the FBG 78 such that the extra FBG 84 transmits all light apart from light having the specific wavelength. The light having the specific wavelength is reflected by the extra FBG 84 back to the optical coupler 16 before it reaches the light detector 14. The optical coupler 16 transmits the light having the specific wavelength to the extra optical coupler 82, which in turn transmits the light having the specific wavelength to the extra light detector 80.

In view of the above, provided the light source generates light having a wavelength matching that which is reflected by the FBG 78 and the extra FBG 84, the extra light detector 80 will receive the light having the wavelength if the optical fibre 8 is transmitting/receiving light. If the optical fibre 8 malfunctions such that it no longer transmits/receives light, no light will be reflected by the FBG 78 (or light with intensity lower than a set threshold). Accordingly, no light will be reflected by the extra FBG 84 and no light will be detected by the extra optical detector 80. Therefore, the presence or absence of light at the extra optical detector 80 indicates whether the optical fibre 8 is operating or malfunctioning, respectively. In this way, the embodiment of FIG. 7 provides a health signal or fibre breakage detector.

It is to be understood that "the light having the specific wavelength" includes light having a specific single wavelength or a specific range of wavelengths.

According to the embodiment of FIG. 7, part of the electromagnetic spectrum is always reflected by the FBG 78 and splitting out this part of the spectrum at the base unit 4 means that one part of the spectrum is used for communication and the other part is used to detect a break in the optical fibre 8 independently of the transceiver 6. Such functionality may be useful for a discrete interface which may be in the "off" state for long periods.

Figure 8:
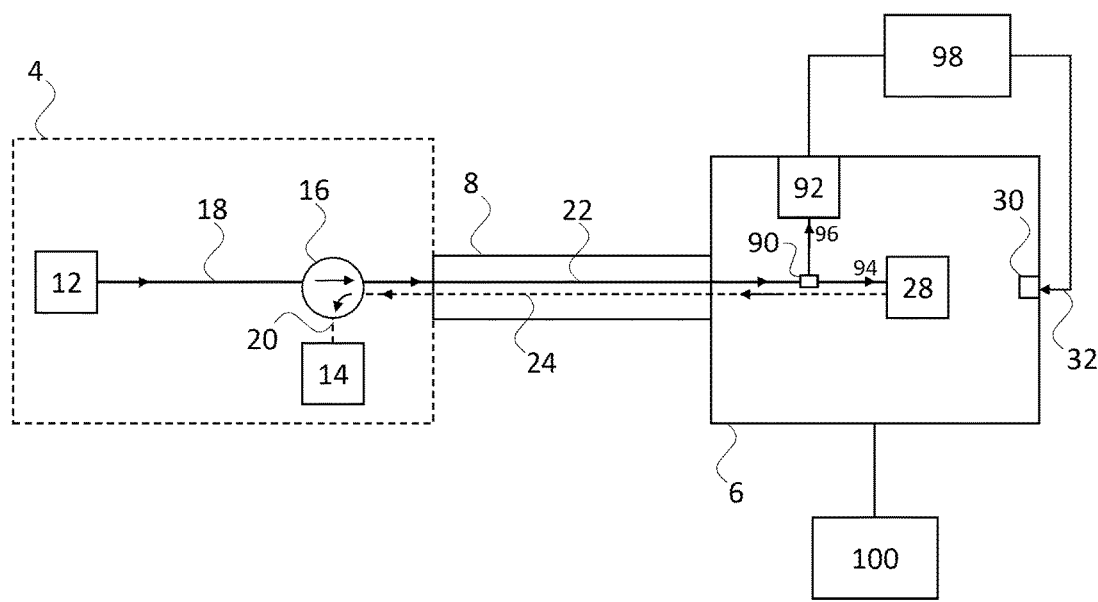
FIG. 8 is a schematic diagram of a fibre-optic communication system in accordance with yet another embodiment of the invention.

FIG. 8 shows a fibre-optic communication system according to an embodiment which could be an extension of any of the above-described embodiments. Specifically, as before, the system includes the base unit 4 optically coupled to the transceiver 6 via the optical fibre 8. The transceiver 6 may be as shown and described with reference to any one of FIGS. 1 to 7. However, in this embodiment, the transceiver 6 includes an optical coupler 90 (such as a fibre coupler or an optical splitter) is positioned in the optical path 22, and an additional light detector 92 in optical communication with the optical coupler 90. The optical coupler 90 receives light from the optical coupler 16 and splits the light into two separate light paths: a light path 94 to the reflector 28, and a light path 96 to the additional light detector 92. Accordingly, the additional light detector 92 receives light generated by the light source 12. In use, the additional light detector 92 is operable to demodulate the received light to extract further information therefrom. For example, the light generated by the light source 12 may be modulated according to further information present at or provided to the base unit 4. In the present embodiment, an amplitude modulation scheme is used, but in some other embodiments, different modulation schemes may apply, such as, a phase, frequency or wavelength modulation scheme. In this embodiment, the additional light detector 92 may be configured in use to demodulate the received light by detecting its amplitude as described above with reference to the light detector 14 of FIG. 2. Accordingly, the further information may be a bit stream.

The system of FIG. 8 further includes a processing device 98 which is communicatively coupled to the additional light detector 92 so as to receive the further information therefrom. Additionally, the processing device 98 is communicatively coupled to the control input 30 of the transceiver 6 and is configured to provide the information 32 thereto. In an embodiment, the processing device 98 is operable to generate the information 32 from the further information extracted by the additional light detector 92.

In an embodiment, the system of FIG. 8 may operate in a half-duplex manner, as explained in the following example. Half-duplex communication may be performed in a cyclical manner such that in a first portion of a cycle, the light source 12 transmits modulated light to the transceiver 6. The additional light detector 92 of the transceiver 6 demodulates the light to extract a first data set (i.e. the further information). The processing device 98 receives the first data set and performs or instructs an action based on the first data set. For example, the processing device 98 may instruct an actuator of a stabilizer of the aircraft 2 to move. Alternatively, the processing device 98 may perform a calculation using the first data set.

Next, the processing device 98 obtains a second data set (i.e. the information 32). For example, a position sensor of the stabilizer of the aircraft 2 may generate position information in the form of the second data set and provide that to the processing device 98. Alternatively, the processing device 98 may generate the second data set by perform a calculation on the first data set. In any case, the second data set is obtained by the processing device 98 which provides it to the control input 30

In a remaining portion of the cycle (i.e. once the first portion of the cycle is over), the transceiver 6 communicates the second data set to the light detector 14 via the amplitude modulated light signal, as described above. It is noted that during the remaining portion of the cycle, the light source 12 continues to provide light to the transceiver 6 so that the transceiver 6 can generate the amplitude modulated light signal therefrom. In this way, the fibre-optic communication system of FIG. 8 can perform half-duplex communication.

Furthermore, the system of FIG. 8 further includes an energy harvesting or scavenging system 100 which is communicatively coupled to the transceiver 6. In use, the energy harvesting system 100 is exposed to energy of one form and is operable to convert that energy into electrical energy for use in powering the transceiver 6 and, possibly, the processing device 98. For instance, the energy harvesting system 100 is capable of deriving electrical energy from an external energy source, such as, solar power, thermal energy, wind energy, kinetic energy (e.g. vibrations), or chemical cells (such as salinity gradients or water-based cells). It is to be understood that the system according to any embodiment described herein may include the energy harvesting device 100 for providing power to the transceiver 6.

In a further embodiment, an alternative way to harvest energy is to use the light itself transmitted by the optical fibre 8. Optical coupler 90 may be used to extract or bleed-off some light transmitted by the optical fibre 8, and light detector 92 could be or could include a photodetector or a photovoltaic cell to convert the extracted or bled-off light into electricity to power reflector 28.

As mentioned above, an advantage of the transceiver according to various embodiments is that it has relatively low power consumption, for example, in the order to about 0.5 mW. This advantage allows the transceiver to be powered by an energy harvesting system, which can output, for example, up to 10 mW. By comparison, optical transceivers (e.g. +1000 mW), electrical Ethernet transceivers (e.g. +400 mW) and electrical wireless transceivers (e.g. +80 mW) are too power consuming to be powered from an energy harvesting system.

A further advantage of using an energy harvesting system to power the transceiver is that the fibre-optic communication system according to various embodiments could include sensor nodes without any electrical connection, thereby reducing the requirements for lightning and electromagnetic protection (LEMP). Using FIG. 6 as an advantage, such sensor nodes could include: the transceiver 6, the energy harvesting system 100, the processing device 98, and a sensor (not shown) communicatively coupled to the processing device 98. In another embodiment, a single smart sensor (not shown) could replace both the processing device 98 and the sensor.

Figure 9:
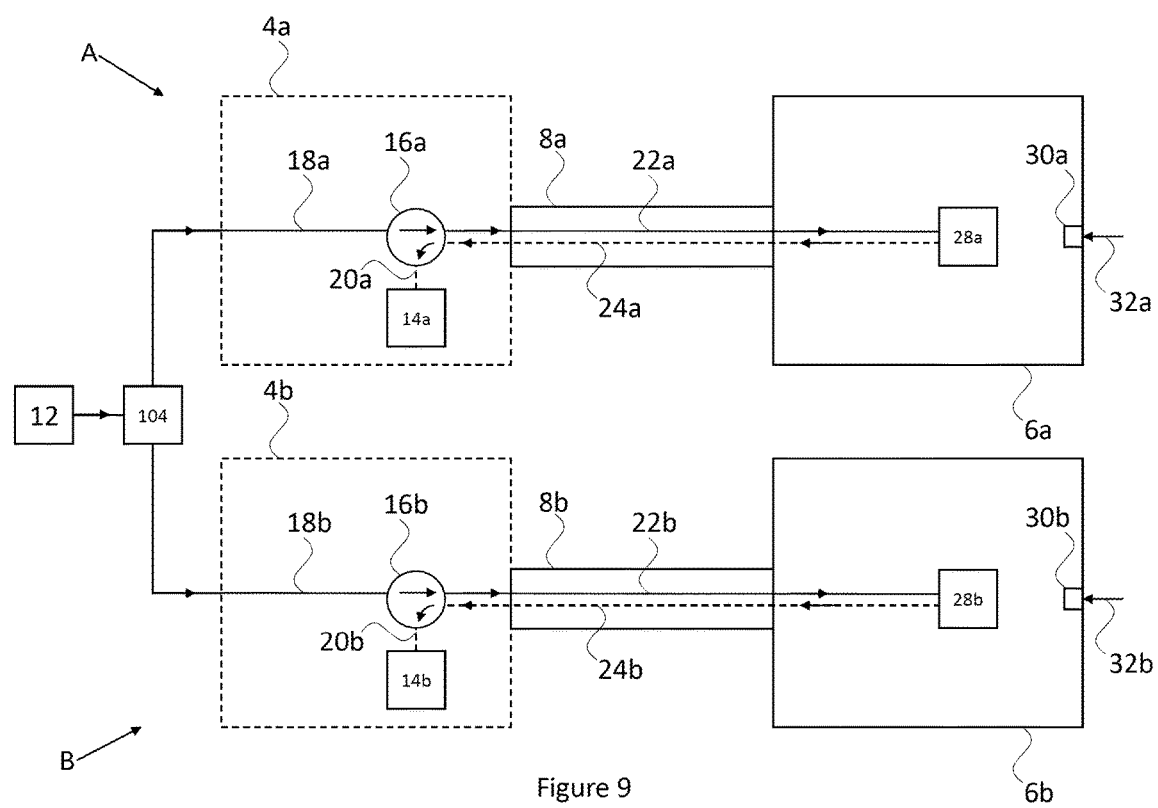
FIG. 9 is a schematic diagram of a fibre-optic communication system in accordance with a further embodiment of the invention.

FIG. 9 illustrates a further extension to the embodiment of FIG. 2. However, the extension of FIG. 9 could also be applied in an analogous manner to any other embodiment described herein. According to FIG. 9, the light source 12 is removed from the system of FIG. 2 and the remaining system is duplicated so as to form a system A and a system B. The removed light source 12 is optically coupled to an optical coupler 104 (such as a fibre coupler or optical splitter) which splits the light generated by the light source 12 into two separate optical paths: an optical path 18a to the optical coupler 16a of the system A, and an optical path 18b to the optical coupler 16b of the system B. Both the systems A and B then operate in accordance with any one of the above described embodiments.

According to the arrangement of FIG. 9, a single light source is used to provide light to multiple separate fibre-optic communication systems. Furthermore, it is to be understood that whilst FIG. 9 shows a single light source providing light to two separate fibre-optic communication systems, in some other embodiments, a single light source provides light to more than two separate fibre-optic communication systems. For example, ten or more separate fibre-optic communication systems may receive light from a single light source. In this way, a scalable fibre-optic communication system is provided.

In the above-described embodiments, it is to be understood that the transceiver 6 does not include a light source. Instead, the transceiver 6 receives light from the remote light source 12 and generates an amplitude modulated light signal from the received light. In this way, the transceiver 6 does not require a local light source. Additionally, the transceiver 6 does not require systems and devices to ensure that a light source remains operational during flight. Such systems and devices may include, but are not limited to, temperature regulating systems such as cooling systems.

In the above-described embodiments the base unit 4 and the base unit 72 are indicated in phantom to illustrate that in at least some embodiments the concept of a base unit is conceptual rather than physical. For instance, the light source 12, the light detector 14 and/or the optical coupling 16 may be provided without any other physical housing, casing or packaging. Also, where a physical base unit is provided which houses some or all of the light source 12, the light detector 14 and/or the optical coupling 16, the housing may include waveguides or optical fibres to transfer light or light signals between different optical components as indicate in the Figures. Taking FIG. 2 as an example, the housing of base unit 4 may include separate waveguides for carrying optical paths 18 and 20, and part of optical paths 22 and 24. Also, the transceiver 6 may include separate waveguides for carrying part of optical paths 22 and 24.

In the above-described embodiments, the reflector is used to selectively reflect light into an optical fibre. It is to be understood that in some embodiments the transceiver may be arranged to reflect light directly into the optical fibre. However, in at least some embodiments, the transceiver may include, or be connected to, an intermediate light collector such that light is reflected to the light collector which collects the light and transmits it into the optical fibre.

In a further embodiment, multiple FBG sensors or other in-line devices may be used in combination with wavelength division modulation (WDM) to share the same fibre. In one such possible embodiment, several FBGs (similar to FBG 78 of FIG. 7) are multiplexed along the optical fibre 8. These several FBGs are arranged to measure strain and temperature along the optical fibre 8 using for instance a WDM measurement approach. That is, strain and temperature are measured by monitoring the wavelength shift of each FBG. The wavelength at which each FBG reflects may be different and may be different from the FBG 78. Multiplexed FBGs work on wavelength shift and it is noted that any wavelength shift does not affect the performance or operation of the transceiver (since the transceiver works on amplitude modulation) as long as the intensity of the received light is sufficient. For example, optical fibre 8 can be attached to the aircraft structure and the strain and temperature can be measured to monitor the health of the structure.

The features and advantages of various different embodiments are described above with reference to the Figures. It is to be understood that one or more features from one embodiment may be combined with one or more features of one or more other embodiments to form new embodiments which are covered by the scope of the appended claims. For example, the energy harvesting system of FIG. 8 may be combined with the transceiver of any one of FIGS. 1 to 7 and 9. Also, the optical coupler, the additional light detector, and the processing device of FIG. 8 may be combined with the transceiver of any one of FIGS. 1 to 7 and 9. Additionally, the FBG, the extra FBG, the extra light detector, and the extra optical coupler of FIG. 7 may be combined with the system of any one of FIGS. 1 to 6, 8 and 9. Further, the separate light source and optical coupler of FIG. 9 may be combined with the systems of any one of FIGS. 1 to 8 so that a single light source provides light to multiple fibre-optical communication systems, which are the same as each other or are different from each other. Furthermore, the transceiver designs of FIGS. 3 to 5 may be included in the systems of any one of FIGS. 1, 2 and 6 to 9.

Although the invention has been described above with reference to one or more preferred embodiments, it will be appreciated that various changes or modifications may be made without departing from the scope of the invention as defined in the appended claims.

The invention claimed is:

1. A fibre-optic communication system for an aircraft, the system comprising:
a light source operable to generate light;
a transceiver in optical communication with the light source so as to receive the light therefrom, the transceiver comprising a control input and a reflector;
an optical fibre in optical communication with the transceiver; and
a light detector in optical communication with the optical fibre;
wherein the transceiver is operable to generate an amplitude modulated light signal by selectively reflecting the light received from the light source into the optical fibre using the reflector according to information received at the control input,
wherein the light detector is operable to receive the amplitude modulated light signal from the optical fibre and to detect an amplitude of the amplitude modulated light signal to extract the information, and
wherein the reflector is positioned to selectively reflect the light received from the light source and the reflector is moved or blocked to generate the amplitude modulated light signal.

2. The system of claim 1, wherein the reflector is blocked and a barrier in the transceiver selectively blocks light transmitted into the optical fibre according to the information received at the control input to generate the amplitude modulated light signal.

3. The system of claim 2, wherein the barrier is positioned in a light path of the transceiver, and wherein the barrier is operable to vary its physical properties to selectively transmit or block light travelling along the light path according to the information received at the control input to generate the amplitude modulated light signal, and wherein the barrier comprises at least one of the following: an electro-optic modulator, a multiple quantum well modulator, a Mach-Zehnder modulator.

4. The system of claim 2, wherein the barrier is a moveable barrier positioned adjacent a light path of the transceiver, the moveable barrier being moveable between a transmission position and a blocking position according to the information received at the control input to generate the amplitude modulated light signal, wherein in the transmission position the moveable barrier is spaced from the light path, and in the blocking position the moveable barrier blocks the light path, and wherein the moveable barrier comprises at least one of the following: a microelectromechanical system (MEMS), a shutter, a rotating barrier, a push-up barrier.

5. The system of claim 1, wherein the reflector is a movable reflector, the moveable reflector being positioned to reflect the light received from the light source and being moveable to selectively direct the reflected light into the optical fibre according to the information received at the control input to generate the amplitude modulated light signal.

6. The system of claim 1, wherein the transceiver is in optical communication with the light source via the optical fibre, and wherein the light source and the light detector are in optical communication with the optical fibre via an optical coupler, the optical coupler being operable to transmit the light from the light source to the optical fibre and to transmit the amplitude modulated light signal from the optical fibre to the light detector.

7. The system of claim 6, wherein the optical fibre comprises a fibre Bragg grating (FBG).

8. The system of claim 7, further comprising an extra light detector, an extra optical coupler, and an extra FBG, the extra FBG being in a light path between the optical coupler and the light detector such that light is reflected by the extra FBG back to the optical coupler, wherein the light source and the extra light detector are in optical communication with the optical coupler via the extra optical coupler, the extra optical coupler being operable to transmit the light from the light source to the optical coupler and to transmit the light reflected by the extra FBG from the optical coupler to the extra light detector, wherein the extra FBG is matched with the FBG.

9. The system of claim 1, further comprising an energy harvesting system electrically coupled to the transceiver, the energy harvesting system being operable to generate electrical power from an external energy source and to provide the electrical power to the transceiver so as to power the transceiver.

10. The system of claim 1, wherein the transceiver does not include a light source.

11. The system of claim 1, wherein the light source is positioned in a temperature-conditioned area of the aircraft, and the transceiver is positioned in a non-temperature-conditioned area of the aircraft, and wherein the temperature-conditioned area of the aircraft is one or more of the following: an avionics bay, a passenger compartment, a flight-deck, and the non-temperature-conditioned area of the aircraft is one or more of the following: a wing, a landing gear, an engine.

12. The system of claim 1, wherein the transceiver further comprises a further light detector in optical communication with the light source so as to receive the light therefrom, the further light detector being operable to demodulate the received light to extract further information therefrom.

13. The system of claim 12, further comprising a processing device communicatively coupled to the transceiver so as to receive the further information therefrom, wherein the processing device is operable to provide the information to the control input.

14. The system of claim 1, further comprising an additional transceiver, an additional optical fibre in optical communication with the additional transceiver, and an additional light detector in optical communication with the additional optical fibre, the additional transceiver being in optical communication with the light source so as to receive the light therefrom, the additional transceiver comprising an additional control input and an additional reflector, wherein the additional transceiver is operable to generate an additional amplitude modulated light signal by selectively reflecting the light received from the light source into the additional optical fibre using the additional reflector according to additional information received at the additional control input, and wherein the additional light detector is operable to receive the additional amplitude modulated light signal from the additional optical fibre and to detect an amplitude of the additional amplitude modulated light signal to extract the additional information.

15. An aircraft comprising a fibre-optic communication system having:
a light source operable to generate light;
a transceiver in optical communication with the light source so as to receive the light therefrom, the transceiver comprising a control input and a reflector;
an optical fibre in optical communication with the transceiver; and
a light detector in optical communication with the optical fibre; and
wherein the transceiver is operable to generate an amplitude modulated light signal by selectively reflecting the light received from the light source into the optical fibre by moving or blocking the reflector according to information received at the control input, and wherein the light detector is operable to receive the amplitude modulated light signal from the optical fibre and to detect an amplitude of the amplitude modulated light signal to extract the information.

16. An aircraft comprising the fibre-optic communication system of claim 1.

17. An optical communication method using a fiber-optic communication system in an aircraft, wherein the fiber optic communication system includes a light source, a transceiver including a control input and a reflector, an optical fiber, and a light detector,
the method includes:
transmitting light through the aircraft from the light source to the transceiver;
receiving information at the control input of the transceiver;
generating an amplitude modulated light signal by modulating the light received at the transceiver to encode the light with the information, wherein the generation of the amplitude modulate light signal includes moving or blocking the reflector to selectively reflect the light received at the transceiver into the optical fiber according to the information received at the control input;
reflecting the amplitude modulated light signal by the reflector into the optical fiber;
detecting the amplitude modulated light signal by a light detector coupled to the optical fiber, and extracting the information from the detected amplitude modulated light signal.

18. The optical communication method of claim 17 wherein the light source is in a forward portion of the aircraft and the transceiver is an aft portion of the aircraft, and the step of transmitting the light includes transmitting the light from the forward portion to the aft portion of the aircraft.

19. The optical communication method of claim 17 wherein the generation of the amplitude modulate light signal includes passing the light received at the transceiver through a barrier operable to selectively block the light according to the information received at the control input.

20. A fiber-optic communication system for a vehicle comprising:
a base unit in an environmentally controlled section of the vehicle, the base unit includes a light source and a light detector;
a transceiver in a section of the vehicle having an unregulated environment, the transceiver receives light from the light source via an optical path between the light source and the transceiver; and
the transceiver includes a control input and a reflector, wherein the control input unit is configured to encode data in the light from the light source by moving or blocking the reflector to modulate an amplitude of the light from the light source, and the reflector is positioned to selectively reflect the light from the light source to the detector such that the detector receives amplitude modulated reflected light from the light source.

21. The fiber-optic communication system of claim 20, wherein the optical path is at least one optical fiber.

22. The fiber optic communication system of claim 20, wherein the vehicle is an aircraft.

* * * * *